US011494928B2

(12) United States Patent
Duong et al.

(10) Patent No.: US 11,494,928 B2
(45) Date of Patent: Nov. 8, 2022

(54) METHOD FOR PREDICTING A THREE-DIMENSIONAL (3D) REPRESENTATION, APPARATUS, SYSTEM AND COMPUTER PROGRAM THEREFOR

(71) Applicant: FONDATION B-COM, Cesson Sevigne (FR)

(72) Inventors: Nam-Duong Duong, Rennes (FR); Amine Kacete, Rennes (FR); Catherine Soladie, La Bouexiere (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

(21) Appl. No.: 17/416,104

(22) PCT Filed: Dec. 10, 2019

(86) PCT No.: PCT/EP2019/084481
§ 371 (c)(1),
(2) Date: Jun. 18, 2021

(87) PCT Pub. No.: WO2020/126693
PCT Pub. Date: Jun. 25, 2020

(65) Prior Publication Data
US 2022/0076438 A1 Mar. 10, 2022

(30) Foreign Application Priority Data

Dec. 20, 2018 (FR) ........................................ 1873626

(51) Int. Cl.
*G06T 7/55* (2017.01)
*G06T 7/80* (2017.01)
(Continued)

(52) U.S. Cl.
CPC ............... *G06T 7/55* (2017.01); *G06N 20/20* (2019.01); *G06T 7/80* (2017.01); *G06T 19/006* (2013.01);
(Continued)

(58) Field of Classification Search
None
See application file for complete search history.

(56) References Cited

U.S. PATENT DOCUMENTS 10,504,008 B1 * 12/2019 Powers .................. G06V 10/60

OTHER PUBLICATIONS

Shotton et al. (Scene Coordinate Regression Forests for Camera Relocalization in RGB-D Images) Proceedings of the IEEE Conference on Computer Vision and Pattern Recognition (CVPR), 2013, pp. 2930-2937 (Year: 2013).*

(Continued)

*Primary Examiner* — Yanna Wu
(74) *Attorney, Agent, or Firm* — Westman, Champlin & Koehler, P.A.

(57) ABSTRACT

A method for predicting a three-dimensional representation in a three-dimensional scene, using one or more two-dimensional representations, obtained from at least one image generated by a camera. The method includes obtaining a forest of regression trees, and for the at least one image: extracting a 2D representation associated with one or more positions within the image; predicting a 3D representation, corresponding to the extracted 2D representation, using the regression tree forest includes a set of possible associations between at least one 2D representation and a 3D representation, each possible association resulting from a predictive model; evaluating one or more of the possible associations of the regression tree forest, according to a predetermined confidence criterion; and updating the regression tree forest including a deactivation of one or more (Continued)

possible associations, depending on the evaluation of the possible associations.

10 Claims, 6 Drawing Sheets

(51) Int. Cl.
*G06N 20/20* (2019.01)
*G06T 19/00* (2011.01)

(52) U.S. Cl.
CPC .............. *G06T 2207/10016* (2013.01); *G06T 2207/10024* (2013.01); *G06T 2207/20081* (2013.01); *G06T 2207/30244* (2013.01)

(56) References Cited

OTHER PUBLICATIONS

International Search Report dated Mar. 20, 2020 for corresponding International Application No. PCT/EP2019/084481, dated Dec. 10, 2019.
Written Opinion of the International Searching Authority dated Mar. 20, 2020 for corresponding International Application No. PCT/EP2019/084481, filed Dec. 10, 2019.
English translation of the Written Opinion of the International Searching Authority dated Mar. 20, 2020 for corresponding International Application No. PCT/EP2019/084481, filed Dec. 10, 2019.
Walch F., et al, "Image-based localization using LSTMs for structured feature correlation," IEEE International Conference on Computer Vision 5ICCV, dated Oct. 2017.
Bay et al., "Speeded-up Robust Features (SURF)", published in the Journal of Computer Vision and Image Understanding, Issue 110, pp. 346-359, in 2008.
A. Kendall et al., "Posenet: A convulational network for real-time 6-DOF camera relocalization," published in Proceedings of the IEEE International Conference on Computer Vision, pp. 2938-2946, 2015.
N.-D. Duong et al., "Accurate sparse feature regression forest learning for real-time camera relocation," in 2018 International Conference on 3D Vision (3DV), pp. 643-652, IEEE, dated 2018.
J. Shotton et al., "Scene coordinate regression forests for camera relocalization in rgb-d images," in Proceedings of the IEEE conference of Computer Vision and Pattern Recognition, pp. 2930-2937, dated 2013.
R. Hartley and A. Zisserman, "Multiple view geometry in computer vision," Robotica, 23(2):271-271, dated 2005.
Duong Nam-Duong et al., "Accurate Sparse Feature Regression Forest Learning for Real-Time Camera Relocalization", 2018 International Conference on 3D Vision (3DV), IEEE, Sep. 5, 2018 (Sep. 5, 2018), pp. 643-652, XP033420103.
Tommaso Cavallari et al, "On-the-Fly Adaptation of Regression Forests for Online Camera Relocalisation", arxiv.org, Cornell University Library, 201 Online Library Cornell University Ithaca, NY 14853, Feb. 9, 2017 (Feb. 9, 2017), XP080747283.
Valentin Julien et al., "Exploiting uncertainty in regression forests for accurate camera relocalization," 2015 IEEE Conference on Computer Vision and Pattern Recognition (CVPR), IEEE, Jun. 7, 2015 (Jun. 7, 2015), pp. 4400-4408, XP032793941.
Meng Lili et al., "Backtracking regression forests for accurate camera relocalization," 2017 IEEE/RSJ International Conference on Intelligent Robots and Systems (IROS), IEEE, Sep. 24, 2017 (Sep. 24, 2017), pp. 6886-6893, XP033266762.

\* cited by examiner

METHOD FOR PREDICTING A THREE-DIMENSIONAL (3D) REPRESENTATION, APPARATUS, SYSTEM AND COMPUTER PROGRAM THEREFOR

CROSS-REFERENCE TO RELATED APPLICATIONS

This Application is a Section 371 National Stage Application of International Application No. PCT/EP2019/084481, filed Dec. 10, 2019, the content of which is incorporated herein by reference in its entirety, and published as WO 2020/126693 on Jun. 25, 2020, not in English.

FIELD OF THE INVENTION

The general field of the invention is the processing of three-dimensional (3D) scenes. The invention can be applied in particular to the tracking of a target in three dimensions by a robot or to the determination of the pose parameters of a camera of an augmented reality system.

STATE OF THE ART

The invention is concerned with the prediction of three-dimensional representations.

The paper *Image-based localization using LSTMs for structured feature correlation*, in *IEEE International Conference on Computer Vision 5ICCV*, October 2017, by F. Walch, C. Hazirbas, L. Leal-Taixe, T. Sattler, S. Hilsenbeck, and D. Cremers describes a solution based on the use of deep learning to determine the localization of a three-dimensional structure. One of the advantages of this solution is that it does not require the storage of reference images. However, it does not allow the localisation of 3D structures that are in motion.

The invention aims, among other things, to remedy the drawback of the aforementioned prior art.

SUMMARY OF THE INVENTION

According to a first aspect of the invention, there is proposed a method for predicting a three-dimensional (3D) representation in a three-dimensional scene, using one or more (preferably invariant) two-dimensional (2D) representations, obtained from at least one image generated by a camera. According to a general feature of this first aspect of the invention, the method comprises obtaining a forest of regression trees, and for said at least one image:

Extracting a 2D representation associated with one or more positions within the image, predicting a 3D representation, corresponding to the extracted 2D representation, using the regression tree forest which comprises a set of possible associations between at least one 2D representation and a 3D representation, each possible association resulting from a predictive model, evaluating one or more of the possible associations defined by the regression tree forest, according to a predetermined confidence criterion, and updating the regression tree forest including a deactivation of one or more possible associations, depending on the evaluation of said possible associations.

In other words, the invention proposes a method for dynamically evolving a forest of regression trees. This evolution can, for example, take place when one or more objects in the scene under consideration are in motion. Updating the regression model, in this case the forest of regression trees, makes it possible to improve the discriminating power of the latter and therefore the quality of the prediction made. Furthermore, adapting the predictive model constituted by the regression tree forest implies a better robustness to external disturbances.

According to one embodiment, in the evaluation step, the prediction can be evaluated for at least one possible association as correct or incorrect according to the predetermined confidence criterion.

The determination of a confidence criterion allows a prediction to be qualified as probably correct or incorrect, and thus to act accordingly on the different steps depending on this prediction.

According to an implementation mode, the predictive model of a possible association is defined by a distribution characterising the at least one 2D representation associated with the 3D representation for said possible association, and by at least one parameter from the set of the following parameters a first parameter representative of a status of the predictive model of the possible association;

a second parameter representative of a number of consecutive predictions evaluated as incorrect for the possible association;

a third parameter representative of the extracted 2D representations associated with the 3D representation by said possible association.

By proposing new parameters to define the predictive model, it is possible to control the evolution of the forest of regression trees. Thus, the parameter representing a "status" (e.g. a Boolean) allows to control on the one hand the activity and the influence of a possible association on the final prediction, and on the other hand the application of the updating process of the other parameters of this same predictive model. The second parameter acts as a histogram of the predictions considered as correct. It plays the role of an alarm, allowing the updating of the forest of regression trees to be initiated. Finally, the third parameter updates the 3D representation as the regression model evolves.

According to an embodiment, the status of the predictive model of a possible association is 'active' when said association is activated or 'passive' when said association is deactivated.

The choice of a binary parameter representative of the status of a predictive model allows for efficient control of the update process. In particular, it helps to avoid irrelevant updates.

According to an embodiment, said updating of the regression tree forest comprises for at least one predictive model of a possible association whose status is 'active':

updating the value of the second parameter for said possible association, based on the result of the evaluation, and if the value of said second parameter is above a predetermined threshold, deactivating said possible association, otherwise maintaining the 'active' status of the predictive model of said possible association.

The predictive model of a possible association uses the second parameter to evaluate the quality of the possible association for several successive 2D representations. The value of this second parameter reflects the sensitivity and stability of the regression model and allows to anticipate its failure and to adapt it in time automatically.

According to an embodiment, the update of the regression tree forest comprises for at least one predictive model of a possible association, updating the value of the third parameter according to the extracted 2D representation, and for at least one predictive model of a possible association having the status 'passive':

if said third updated parameter meets a predetermined condition, a new determination of the distribution characterizing the 3D representation related to said possible association and a new determination of the 3D representation of said possible association, and if the covariance of the newly determined distribution is below a predetermined threshold, a validation of said update of the value of the third parameter, the newly determined distribution and said newly determined 3D representation, and an activation of the predictive model of said possible association, otherwise a reset of the value of the third parameter and a maintenance of the 'passive' status of the predictive model of said possible association.

In other words, the predictive model of a possible association is able to readjust its own parameters during the course of successive predictions. In order to definitively validate the relevance of the updates, an evaluation of the newly determined values is triggered, based on a covariance of the newly determined distribution (and more precisely in practice on the trace of the covariance matrix). This control mechanism makes the update step robust to changes that should not have led to an update of the regression model.

According to an embodiment, the method may further comprise an update of the pose parameters of said camera, according to the possible associations assessed as correct or incorrect.

The method can be implemented by a computer.

According to a second aspect of the invention, there is proposed a device for the prediction of a three-dimensional (3D) representation in a three-dimensional scene, using one or more two-dimensional (2D) representations, obtained from at least one image generated by a camera, said device comprising a computing machine dedicated to or configured to:

obtain a forest of regression trees, and for said at least one image:

extracting a 2D representation associated with one or more positions within the image, predicting a 3D representation, corresponding to the extracted 2D representation, using the regression tree forest that defines comprises a set of possible associations between at least one 2D representation and a 3D representation, each possible association resulting from a predictive model, evaluating one or more of the possible associations defined by the forest of regression trees, according to a predetermined confidence criterion, and updating the regression tree forest including a deactivation of one or more possible associations, depending on the evaluation of said possible associations.

According to an embodiment, said computing machine may be dedicated to or configured for at least one possible association, evaluating the prediction as correct or incorrect according to the predetermined confidence criterion.

According to an embodiment, the device may further comprise a module dedicated to or configured to update pose parameters related to said camera, according to possible associations assessed as correct or incorrect.

According to a third aspect of the invention, an augmented reality system is proposed comprising:

a camera capable of acquiring an image of a three-dimensional scene, a module capable of delivering an output image from an input image acquired by said camera, representing said scene in three dimensions and at least one real or virtual object, from:

a 3D representation of the at least one object in the scene, and of the camera's installation parameters, a display module capable of displaying the output image.

According to a general characteristic of this third aspect of the invention, the system comprises a device according to the second aspect of the invention, allowing to update the pose parameters of said camera.

According to a fourth aspect of the invention, there is provided a computer program comprising instructions for implementing a method according to any of the implementation modes of the first aspect of the invention, when said program is executed by a processor.

According to a fifth aspect of the invention, there is provided a computer-readable recording medium on which is recorded a computer program comprising program code instructions for carrying out the steps of the method according to any of the embodiments of the first aspect of the invention.

LIST OF FIGURES

Other advantages and characteristics of the invention will become clearer on reading the following description of a particular embodiment of the invention, given by way of a simple illustrative and non-limiting example, and of the appended drawings, among which:

FIG. 1 describes a method for predicting a 3D representation according to the invention;

FIG. 2 shows in more detail an example of the step of predicting a 3D representation from 2D representations extracted from an image in RGB (Right Green Blue) format;

FIG. 3 describes an implementation of a learning step in order to obtain an initial regression tree forest for a prediction of a 3D representation according to the invention;

FIG. 4 schematically represents an example of a forest of regression trees used by the method for predicting a 3D representation according to the invention;

DESCRIPTION OF PARTICULAR MODES OF IMPLEMENTATION OF THE INVENTION

Figure 1:
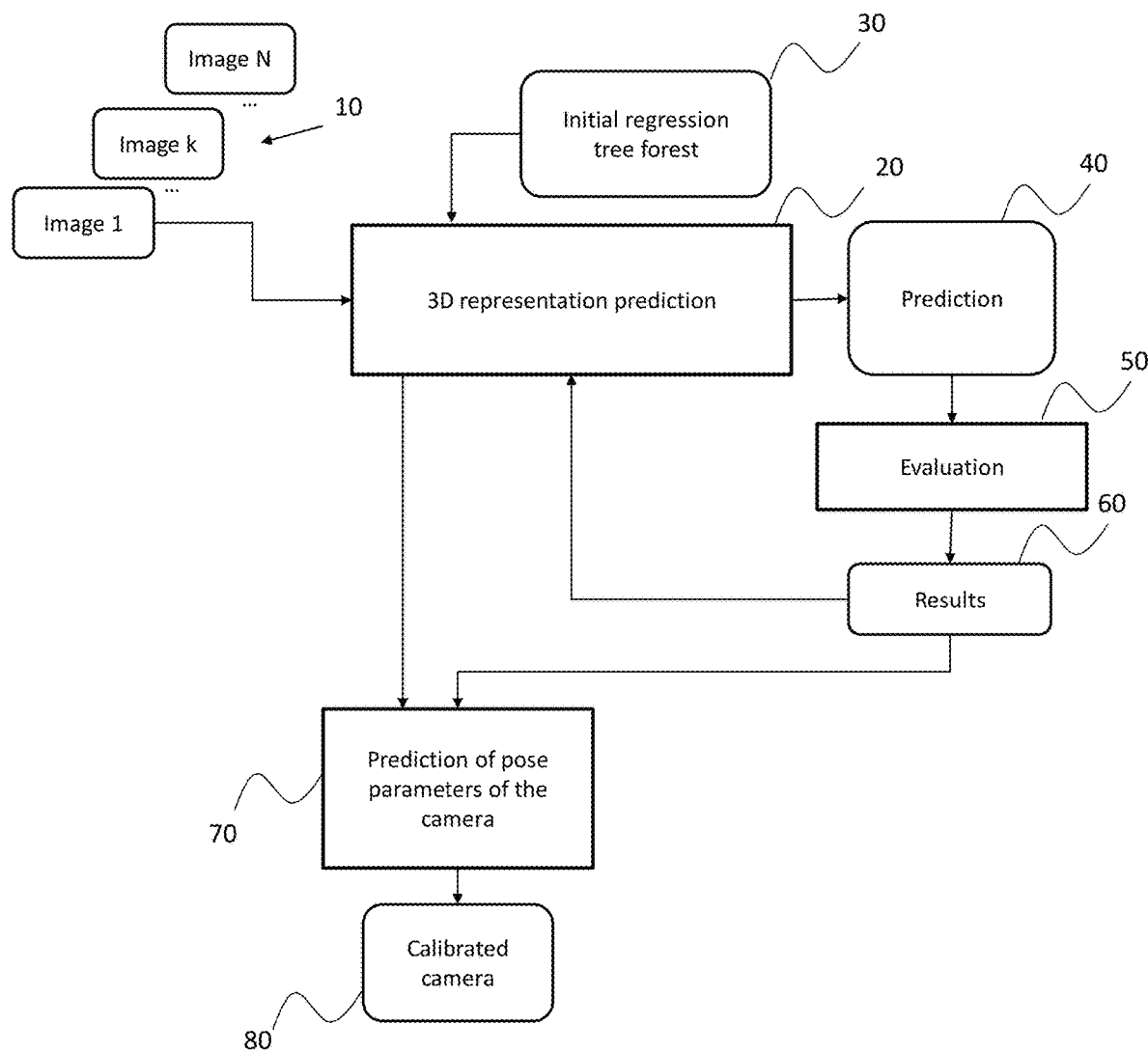

FIG. 1 illustrates an example of a method for predicting a 3D representation according to the invention.

According to this embodiment, images 10 for example in RGB format are generated by a camera. These images can be extracted from a video sequence and be temporally independent. Conversely, these images may form a sequence of successive, time-dependent images.

These images represent a three-dimensional (3D) scene captured by the camera including one or more 3D objects. A prediction step 20 allows, from these images 10, to predict a 3D representation of one of these objects. A 3D representation refers, for example, to a single 3D point, a 3D point cloud or the three-dimensional location of this point or points in the point cloud.

Preferably, the images in the image set 10 are processed one by one.

The prediction is performed using an initial regression tree forest 20, mapping a 3D representation to one or more two dimensional (2D) representations. Recall that regression tree forests consist of running a large number (e.g. 400) of randomly constructed regression trees in parallel, before averaging them.

Figure 3:
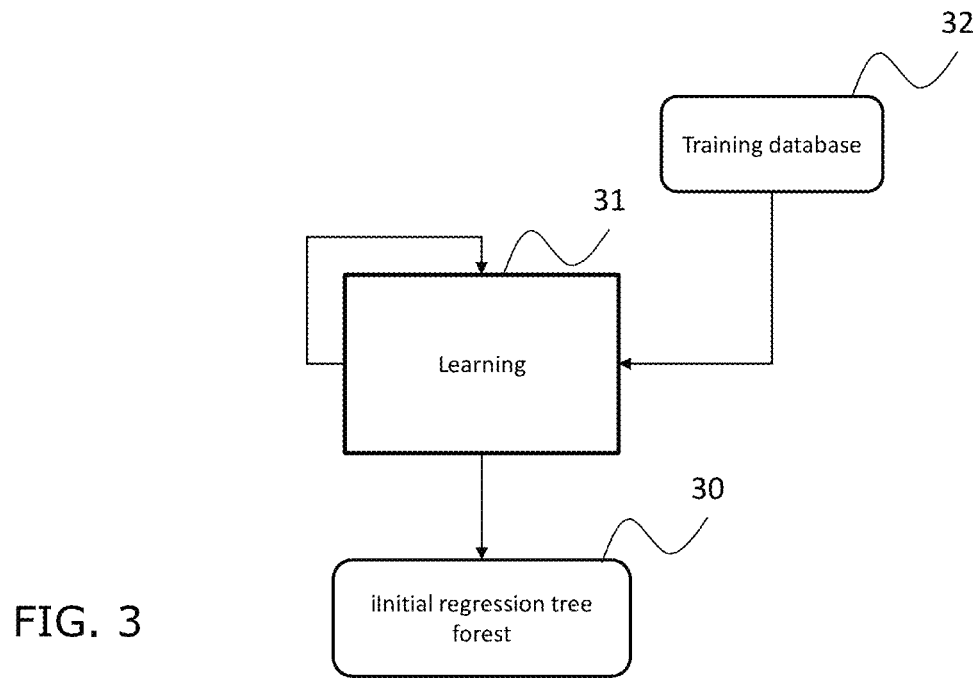

In other words, the regression tree forest defines several possible associations between one or more 2D representations and a 3D representation. A 2D representation can be, for example, a single 2D point, a 2D line, a 2D pattern or the position of any of these elements. An example of how to obtain the initial regression tree forest is shown in FIG. 3 below.

Figure 2:
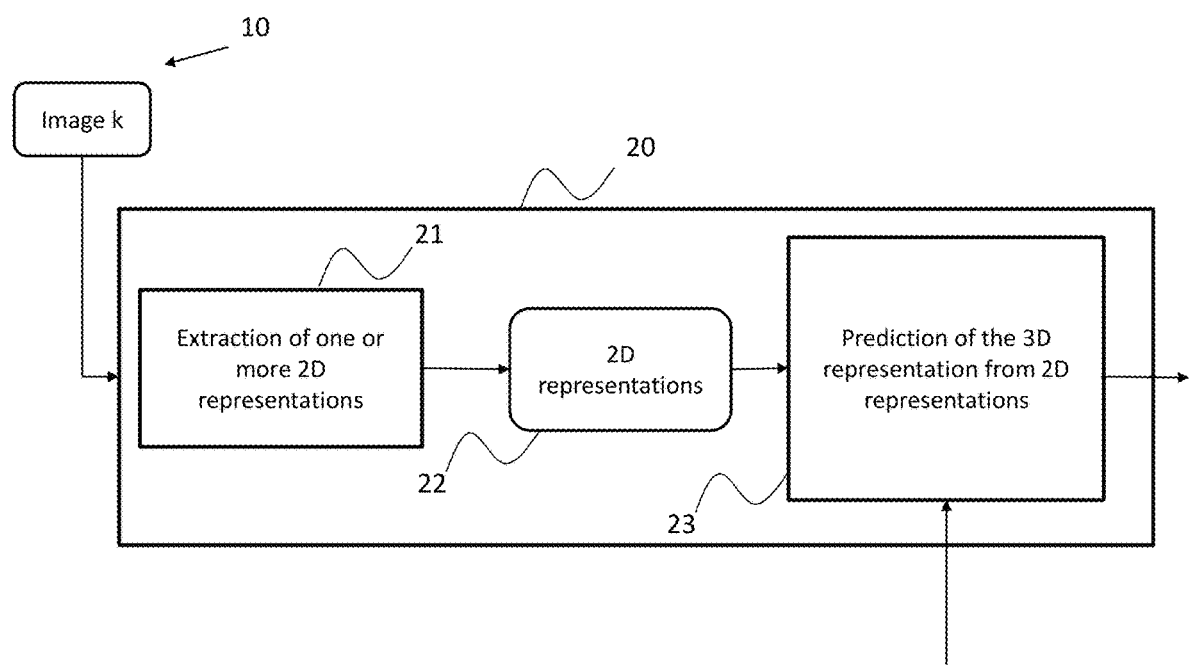

As illustrated in more detail in FIG. 2, the prediction 20 comprises a step 21 of extracting one or more 2D representations 22 associated with one or more positions within the considered RGB image. In the following description, a 2D representation is considered to be defined by a characteristic $f_i$ represented by a vector $f_i$ $(v_1, v_2, \ldots, v_d)$ as defined below. For example d=64.

More precisely, a feature vector defining a 2D representation can be extracted from a "patch", i.e. a portion of the RGB image under consideration, arranged or centred around a point of interest. In the following description, unless otherwise indicated, it will be considered for simplification purposes that a single thumbnail is obtained per image, and that a feature vector is extracted from this same thumbnail. This feature vector will allow the prediction of a 3D representation. The case of several thumbnails per image is easily deduced from the description.

Features describe a variability and orientation of the image pixel intensities (or pixel components) in the vicinity of the point of interest. An extraction function $\phi$ to obtain a feature vector $f_i$ for a point of interest $KP_i$ is defined according to the following equation:

$$f_i=\phi(KP_i).$$

According to a first embodiment, function $\phi$ can perform an extraction of invariant features from the point of interest $KP_i$ of the thumbnail, for example according to a SURF-type technique described in the document by Bay et al. entitled "*Speeded-up Robust Features (SURF)*", published in the journal *Computer Vision and Image Understanding*, issue 110, pages 346-359, in 2008. A feature is said to be invariant when it is associated with a point of interest that is invariant to image transformations, such as rotations, transformations or scale changes.

In a second embodiment, function $\phi$ can perform feature extraction using a supervised automatic prediction system. The supervised automatic prediction system can implement a Convolutional Neural Network (CNN) as described in the article by: A. Kendall, M. Grime, and R. Cipolla: *Posenet: A convolutional network for real-time 6-DOF camera relocalization*, published in *Proceedings of the IEEE International Conference on Computer Vision*, pages 2938-2946, 2015.

A step 23 of predicting the 3D representation from the extracted 2D representations 22 is performed as explained below with reference to FIG. 5.

Reference is again made to FIG. 1. At the end of the prediction step 20, a predicted 3D representation 40 is output.

This one is processed a posteriori to evaluate the accuracy of the prediction in a step 50.

Results 60 are then used:

on the one hand for step 23 of predicting a 3D representation from the extracted 2D representations, and on the other hand, in the example of FIG. 1, for an estimation step 70 of the camera pose parameters and more precisely, for updating the pose parameters.

More generally, the results 60 based on the prediction 40 of the 3D representation can be used to estimate parameters related to the camera calibration. In FIG. 1, they are used for the estimation of camera pose parameters. A well-known principle of pose estimation consists in following a marker in the scene, whose position and 3D geometry are known a priori, in order to calibrate the camera (position, orientation, etc.).

In the context of augmented reality, a virtual object can be embedded in the three-dimensional scene with the help of an augmented reality system depending on the pose parameters of the camera.

In an industrial context, the parameters estimated with the help of the results 60 and in particular the camera pose parameters can be used for target tracking:

when the camera allows automatic navigation (in the context of autonomous vehicles for example), when the camera is on board to control a robot, or when the camera is an intelligent surveillance camera, for example with automatic tracking of an object in the filmed scene.

Reference is now made to FIG. 3, which represents a flowchart that illustrates an example of obtaining the initial regression tree forest 30. Preferably this is obtained by implementing a pre-learning phase 31 from a training database 32. An example of a prior learning phase is given in the paper by N.-D. Duong, A. Kacete, C. Soladié, P.-Y. Richard, and J. Royan, *Accurate sparse feature regression forest learning for real-time camera relocation*, in 2018 *International Conference on* 3D *Vision* (3DV), pages 643-652, IEEE, 2018.

The training database 32 comprises a group of images in RGB format. A set of features are extracted using, for example, the SURF method described above with reference to FIG. 2. The purpose of the training phase is to classify each feature, and hence the 2D representation they define, using a forest of regression trees. Each leaf of each tree defines a possible association between one or more 2D representations and a 3D representation.

The training phase of the regression tree forest requires labelling the data in the training database with a 3D representation, for example defined by its coordinates $P_i^w$ in a three-dimensional frame $P_i^w=(X_i^w,Y_i^w,Z_i^w)$, i representing the index of the 3D representation considered, out of all the possible 3D representations, and w representing a world referential used. In other words, labelling amounts to associating one or more 2D representations extracted from the images in the database with a 3D representation defined here by its coordinates.

One possible method is to perform a triangulation between two RGB images representing a scene from at least two different viewpoints, in order to achieve a coupling between a point of interest found in each of the images, and a three-dimensional point in the first reference frame. Finally, according to another method, it is possible to use RGB-D images from the correctly calibrated camera for the database 32. An RGB-D image makes it possible to associate each pixel of the image with a depth value obtained from the camera's exposure parameters. In this last method, from the position of the point of interest $p_i=(u_i,v_i)$ detected in an RGB-D image and the associated depth value D, associated with it, an associated 3D representation $P_i^c=(X_i^c,Y_i^c,Z_i^c)$ in a second frame of reference linked to the camera, is calculated. This calculation is performed using a model of the camera, based on a standard pinhole camera model as defined below:

$$P_i^c = D_i K^{-1} \begin{bmatrix} p_i \\ 1 \end{bmatrix}.$$

Where K is a matrix defining the intrinsic parameters of the camera, and the exponent c designates the second reference frame, linked to the camera. The camera pose is defined by T=[R|t] including a rotation matrix R and a translation vector t for each image, which are assumed to be known beforehand. The 3D representation $P_i^w=(X_i^w,Y_i^w,Z_i^w)$ representation defined in the first reference frame, corresponding to the point of interest p, is obtained using the following equation:

$$\begin{bmatrix} P_i^w \\ 1 \end{bmatrix} = \begin{bmatrix} R & t \\ 0 & 1 \end{bmatrix} \begin{bmatrix} P_i^c \\ 1 \end{bmatrix}.$$

Figure 4:
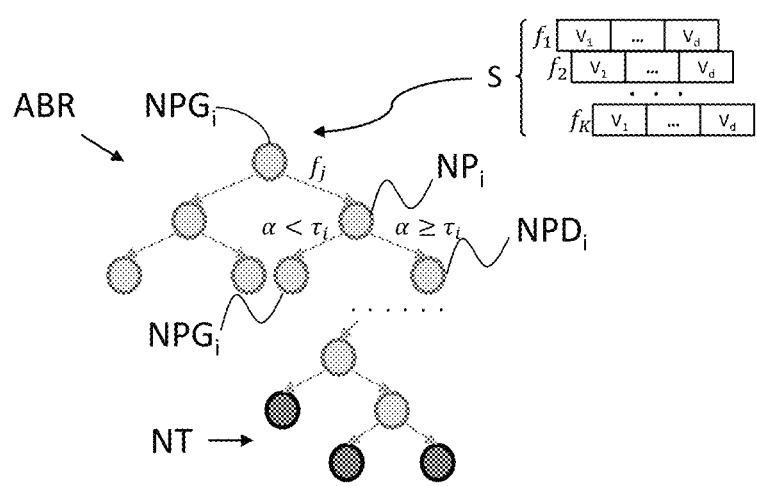

FIG. 4 shows a tree of a forest of regression trees. A so-called initial regression tree forest 30 is obtained by learning in step 31.

A forest of regression trees consists of a set of trees, of which an example ABR is shown in FIG. 4. Each tree consists of $NP_i$ nodes, each node being associated with a split function. The first node of the tree is called the root node NR. Each terminal node NT forms a leaf that represents a possible association between one or more 2D representations and a 3D representation. This possible association is the result of a predictive model based on the different classifications performed by each cut-off function leading to the NT terminal node.

More precisely, a node $NP_i$, NR is characterised by the parameters of its cut-off function. At the beginning of the learning phase 31, each cut-off function is said to be weak, i.e. for a parent node $NP_i$, the cut-off function distributes the data in a child node to the left $NFG_i$ or to the right $NFD_i$ with a slightly higher result than a random distribution. The weak cut-off function for node $NP_i$ is parameterised by $\theta_i=\{ref_i,\tau_i\}$ where $ref_i$ is a reference feature vector (or 2D representation), and $\tau_i$ is a predetermined threshold.

During the learning phase 31, a set of feature vectors is extracted, and then for each tree in the regression tree forest, a subset $S_i$ of feature vectors is randomly selected from the extracted set.

Thus, for each tree, a feature vector $f_j$ ($v_1,v_2,\ldots,v_d$) (j being an index of the feature varying between 1 and an integer K) of the corresponding subset $S_i$, is processed from the root node NR to a terminal node NT (leaf), with a classification performed at each node $NP_i$ by the cut-off function associated to the considered node:

$$h(f_j, \theta_i) = \begin{cases} 0, \text{ si } d(ref_i, f_j) < \tau_i, \text{ classification } dans \text{ } le \text{ } noeud \text{ } gauche \\ 1, \text{ si } d(ref_i, f_j) \geq \tau_i, \text{ classification } dans \text{ } le \text{ } noeud \text{ } droit \end{cases}$$

where $d(ref_i,f_j)=\|ref_i-f_j\|_2^2$ is a Euclidean distance function $\theta i=\{refi, \tau i | refi \in Si\}$.

The cut-off function h associated with each node $NP_i$ of the considered tree, is thus applied to each feature $f_j$ of this subset $S_i$ in order to classify it in a right node $NFD_i$ ($S_i^D$) or left node $NFG_i$ ($S_i^L$). The cut-off function h is then trained to minimise the spatial variance of the feature vectors classified in the NT or leaf end nodes. This principle is described, for example, in the paper by J. Shotton, B. Glocker, C. Zach, S. Izadi, A. Criminisi, and A. Fitzgibbon, *Scene coordinate regression forests for camera relocalization in rgb-d images*, in *Proceedings of the IEEE conference of Computer Vision and Pattern Recognition*, pages 2930-2937, 2013. More precisely, the parameters of the weak predictor are optimized by minimizing an entropy energy, based on an information gain Q computed on the result of the separation performed by the weak predictor which can be defined as follows:

$$Q(S_i, \theta_i) = \sum_{d \in \mathcal{L}, \mathcal{R}} \frac{|S_i^d(\theta_i)|}{|S_i|} V(S_i^d(\theta_i))$$

$$\text{with } V(S) = \frac{1}{|s|} \sum_{m \in S} \|P_i^w - \overline{P_i^w}\|_2^2$$

Where

Q corresponds to the information gain, which represents an entropy measure for evaluating the purity of each node, i.e. the degree of homogeneity of the characteristics associated with it at each classification by the cut-off function, $\mathcal{L}$ and $\mathcal{R}$ denote the nodes to the left and right of an NPi node respectively, associated with characteristics $f_j$;

m represents the coordinates of the feature vector considered in the first frame and $\overline{m}$ represents an average of these coordinates.

Note that in the case of an unbalanced tree (i.e. with an unbalanced distribution of 2D representations in the terminal nodes), extensive learning may be required with a higher learning time. However, in order to limit this learning time without compromising the accuracy of predictions, the parameters of the weak cut-off functions can be balanced at higher levels of the tree. Thus the cut-off function of an $NP_i$ node at a higher level learns to balance the feature vectors between its right and left node by choosing a reference feature $ref_i$ and a suitable threshold $\tau_i$ such that:

$$\theta_i=\{ref_i,\tau_i\|S_i^L|=|S_i^R|\}.$$

The initial regression tree forest is acquired when a maximum depth value is obtained for each tree or the number of data classified in a node does not fall below a predefined minimum value. In each NT terminal node (leaf) defining a possible 2D representation/3D representation association, the 2D representations are characterised by a Gaussian distribution $\eta(P,\overline{P},\Sigma_P)$ where $\Sigma_P$ represents the covariance of the Gaussian distribution, where P symbolises the coordinates $P_i^w=(X_i^w,Y_i^w,Z_i^w)$.

Figure 5:
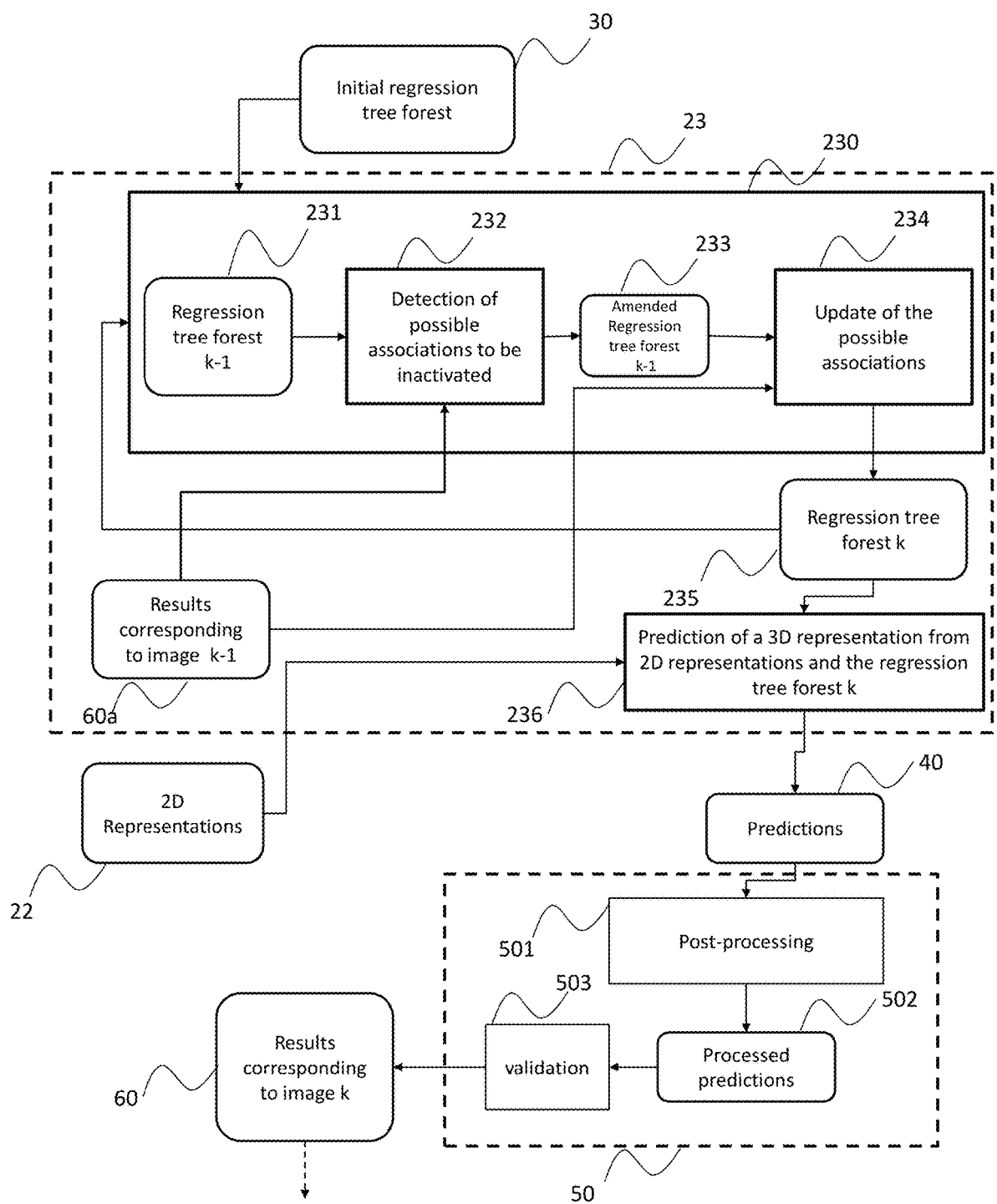
FIG. 5 illustrates more particularly an implementation of the step of updating the forest of regression trees according to the invention.

Reference is now made to FIG. 5, which describes in more detail the step 20 of predicting a 3D representation and evaluation 50.

Step 23 comprises a substep 236 of predicting a 3D representation from feature vectors extracted from a thumbnail image from a k-index image and a k-index regression tree forest 235.

This forest 235 was updated in a sub-step 230, based on the validated results obtained for feature vectors extracted from a thumbnail image from an image of index k−1, 60a and the regression tree forest of index k−1 used to process the feature vectors extracted from the image of index k−1.

The indices correspond to an order of image processing and do not necessarily correspond to a temporal order.

According to the invention the predictive model leading to each terminal node or leaf l of the trees of the k−1 regression forest is characterised by a Gaussian distribution $\eta(P,\overline{P},\Sigma_P)$ as described above with reference to FIG. 4, and three parameters (or at least one of these three parameters, by inferring the other parameters for example), such as:

$$l = (\eta, s, n_{false}, S_{data})$$

where, s corresponds to the status of the predictive model of a leaf—preferably it can take two values: '0': passive status or '1': active status—a leaf whose predictive model has the status "passive" is either a leaf with a large variance or a leaf corresponding to an association with a 3D representation corresponding to a moving object in the captured scene—predictions for which 2D representations are assigned to leaves whose predictive model status is "passive" are not considered to be a prediction only those leaves whose predictive model has the status "active" are considered to be predictions—when at the end of the evaluation step 50, the correctness of a prediction is questioned, the status of the predictive model of the leaf in question is changed to "passive"—the "active" status can be restored later on as described below;

$n_{false}$ corresponds to the number of preferably consecutive predictions, which have been validated as incorrect in step 50—for example, this parameter is assigned the value "0" when a prediction is considered correct—as explained below, this parameter allows to restore an "active" status;

$S_{data}$ is representative of the extracted 2D representations, which are associated with the 3D representation by the sheet in question—this parameter also allows to restore an "active" status.

In a first step, a step 232 allows to detect possible associations to be inactivated within the k−1 regression tree forest. For this purpose, step 232 receives as input the results 60a from the processing of the image k−1. These results 60a are used to count the incorrect predictions ("outliers") for each possible association (or leaf) whose predictive model status is "active". If a leaf, whose predictive model status is active, has resulted in an incorrect prediction, the parameter $n_{false}$ parameter is incremented by 1. On the contrary, if a leaf with an active predictive model status has resulted in an inlier, the value of the $n_{false}$ is reset to zero. Finally, if we detect that $n_{false} > \max_{false}$, $\max_{false}$ being a predetermined threshold, the status s of the predictive model of the leaf in question becomes "passive". Indeed, the possible association has given rise to $\max_{false}$ consecutive incorrect predictions, it is therefore inactivated for the rest of the method, i.e. any prediction made from an inactivated leaf is not considered in the evaluation step 50.

The output of the detection step 232 is therefore a modified k−1 regression tree forest 233, with leaves having their parameter value $n_{false}$ and potentially the status s of their predictive model inactivated.

This modified k−1 regression tree forest 233 is output as input to a step 234 of updating the parameters of the k−1 regression tree leaf set. The use of invariant features allows the same regression tree forest to be used for the same three-dimensional scene, even when objects are moving within the scene. By only updating the resulting leaf parameters, optimal prediction of 3D representations can be achieved. The purpose of step 234 is precisely to update the parameters characterising the predictive model of the leaves whose status is "passive". During the processing of each image, vectors of statistics are classified using the prediction tree forest, allowing a set of vectors of statistics to be collected for each leaf.

Thus, step 234 comprises updating the contents of the parameter $S_{data}$ for each leaf whose predictive model has a passive status, for example by adding to a stack each new feature vector classified in the leaf whose predictive model has a "passive" status. If the size of the stack $S_{data}$ is greater than a pre-determined threshold $\max_{data}$ ($|S_{data}| > \max_{data}$), a new distribution $\eta(P,\overline{P},\Sigma_P)$ of the passive leaf is determined. The coordinates of the 3D representation, P, are then recalculated using a function $F_{label}$ such that $P = F_{label}(S_{data})$. The predictive model of the regression tree forest is thus redefined. Finally, if $|\Sigma_P| < \max_{var}$ (or if the trace of the covariance matrix is below a predetermined threshold), max, being a predetermined threshold, the update of the Gaussian distribution and the update of P is validated and the "active" status is reactivated. Conversely, if $|\Sigma_P| \geq \max$, the feature vector stack of $S_{data}$ is reset and the status is maintained as "passive".

The regression tree forest 235 is then issued to proceed to the prediction of a 3D representation from the feature vectors (2D representations) extracted from the k-index image.

The invention therefore proposes to use a dynamic regression tree forest, where the possible associations between one or more 2D representations and a 3D representation can evolve over time. The invention is particularly suitable for estimating the pose parameters of a camera capturing a three-dimensional scene in which one or more objects are in motion. The modification of the regression tree forest generated by the movement of an object leads to a better on-the-fly estimation of the pose parameters, for a better capture of the scene. This update of the camera pose parameters is described in more detail with reference to FIG. 6 below.

Note that for the first image processed, the regression tree forest used is the initial regression tree forest 30. Steps 232 and 234 do not modify the forest 30 when processing the first image, in the absence of existing results 60 a. This initial regression tree forest 30 is then progressively updated as more images are processed and results are generated.

The prediction step 236 classifies the feature vectors 22 using the k-index regression tree forest, so as to predict a 3D representation. If we generalise to several thumbnails obtained per image, there comes for image k a set of feature vectors $\{f_i\}$ corresponding respectively to a set of thumbnails $\{Im_i\}$. Each feature vector is processed by the decision tree forest, which returns for an input $\{Im_i,f_i\}$ a prediction of a 3D representation at a leaf of the tree of index j of said forest. When all feature vectors are processed, a set $LP = \{l_j^i\}$ of leaves that have given rise to a prediction is obtained. All leaves in the set LP with an "active" status are used as input to a post-processing step 501 to calculate processed predictions 502 using a post-processing function $F_{post}$ such as the one proposed below:

$$F_{post}(\{Im_i, f_i, l_j^i | s_j^i = 1\})$$

where $s_j^i$ is the status of the leaf (or possible association) of tree j used for prediction.

Then a validation step 503 allows to calculate a confidence criterion for the post-processed predictions. The validation step defines which predictions are correct ("inliers") or incorrect ("outliers"). Validation is carried out using a validation function $F_{val}$ for example:

$$F_{val}(\alpha(F_{post}, \text{Im}_i, l_j^i)) = \begin{cases} 1, & \alpha(\cdot) < \max_{val}, \text{ correct prediction} \\ 0, & \alpha(\cdot) \geq \max_{val}, \text{ incorrect prediction} \end{cases}$$

where $\alpha(F_{post}, \text{Im}_i, l_j^i)$ is a prediction error function associated with the leaf $l_j^i$ based on Fpost and the thumbnail $\text{Im}_i$. The post-processing 501 and validation 503 steps form the evaluation step 50.

After validation, the results 60 are obtained, which include $n_{inliers}$ predictions considered to be correct and $n_{outliers}$ predictions considered to be incorrect. A confidence criterion is determined and compared to a predetermined threshold, such that the update performed in step 234 is validated when the confidence criterion is greater than the predetermined threshold such that:

$$\frac{n_{inliers}}{n_{inliers} + n_{outliers}} > \max_{conf},$$

where $\max_{conf}$ is a threshold that validates the update step 234 for the regression tree forest of index k, which will be used for the processing of image k+1.

Figure 6:
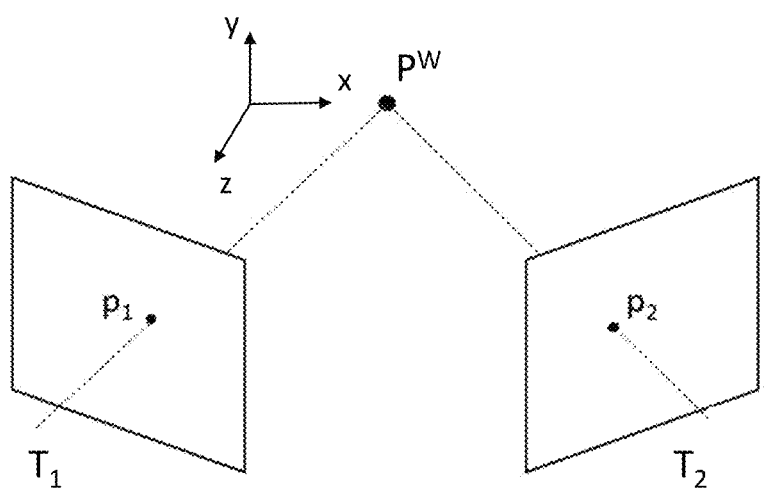
FIG. 6 shows very schematically a method of triangulating a point in three dimensions.

Reference is now made to FIG. 6 which illustrates the step for estimating the pose parameters of the camera 70. This step only takes into account predictions associated with leaves whose predictive model has the status "active". According to one embodiment, results corresponding to three points of interest in an input image k may be required to perform the estimation. According to another embodiment using an algorithm known to a person having skills in the art, called PnP (for "Perspective-n-Points"), this constraint can be avoided. Another method proposes to combine the PnP algorithm with a method known as RANSAC (for "RANdom Sample Consensus") to remove predictions defined as incorrect ("outliers") and to keep only predictions defined as correct ("inliers").

During the validation step 503 prior to the estimation step 70, the RANSAC method then generates a set of hypothetical poses $\mathcal{T} = \{\mathcal{T}_i\}$ and applying the PnP algorithm on a randomly selected subset of the 3D representation predictions. Then the most satisfactory correct predictions are obtained by maximising this number of correct predictions corresponding to each hypothetical pose based on a re-projection error:

$$\max_{\forall T_i \in \mathcal{T}} \sum_{p_j \in p} \rho(\alpha_{ij})$$

$$\rho(\alpha_{ij}) = \begin{cases} 1, & si \, \alpha_{ij} < \tau \\ 0, & sinon \end{cases}$$

where $\alpha_{ij} = \|p_j - KT_i^{-1}\hat{P}_j^w\|^2$ and $\tau$ is the maximum reprojection error threshold that defines a correct prediction and where the function $\rho(\cdot)$ corresponds to a metric for evaluating the correctness or otherwise of a prediction. This function is another example of a validation function $F_{val}$ of step 503, where the results 60 are used for pose parameter estimation.

The point of interest transformed by the pose of index i, having an index j, is considered to give rise to a correct prediction for the hypothetical poses $\{\mathcal{T}_i\}$ if $\rho(\alpha_{ij})=1$.

The parameters of the final camera pose T are obtained by applying in step 70 the PnP algorithm on all correct predictions ("inliers") in order to minimize the re-projection error function E(T):

$$E(T) = \sum_{w} \|p_i - KT^{-1}\hat{P}_i^w\|^2$$

where J corresponds to the set of indices of correct predictions, E(T) being the re-projection error corresponding to an energy that we seek to minimise. In other words, by minimising the function E, we obtain the optimal pose T.

The camera's pose parameters can be updated according to the proportion of correct predictions:

$$\frac{n_{inliers}}{n_{inliers} + n_{outliers}}.$$

Only when this proportion is sufficiently large, an update of the estimated parameters is performed.

The estimation of the camera pose parameters consists of recalculating them from the results of the detection 232 and update 234 steps. In this case, the data stored in the stack Sdata of each passive sheet includes the position $_{pi}$ associated with the 2D point of interest and the camera pose T. When the size of the stack exceeds a predetermined value ($\max_{data}$), the value of the 3D representation associated with the passive sheet is re-evaluated using a triangulation algorithm from two interest points stored in the p1 and p2 stacks shown in FIG. 6. These points of interest are stored with their respective poses $_{T1}$ and $_{T2}$. Such a triangulation method is for example described in the article R. Hartley and A. Zisserman, Multiple view geometry. Zisserman, *Multiple view geometry in computer vision*, Robotica, 23(2):271-271, 2005.

The new $P^W$ value of the 3D representation in the first reference frame is obtained by solving the following system of equations:

$$\begin{cases} p_1 * (KT_1^{-1} P^w) = 0 \\ p_2 * (KT_2^{-1} P^w) = 0 \end{cases}$$

Figure 7:
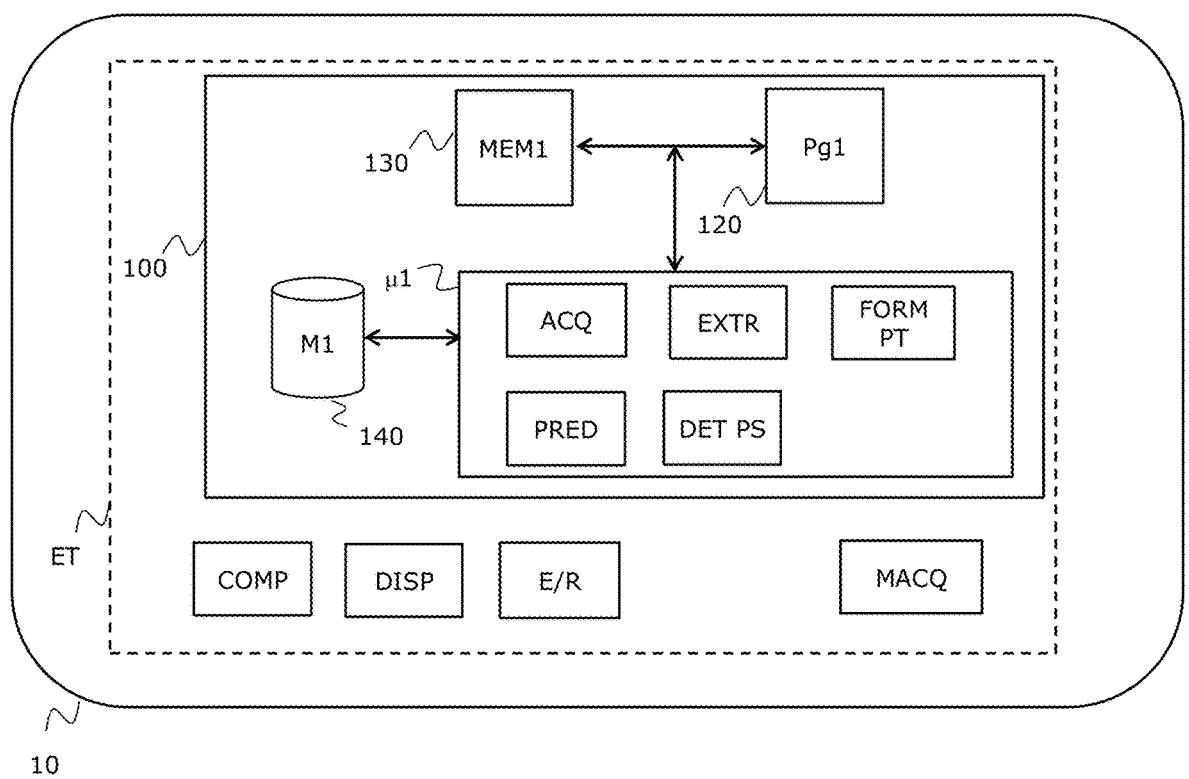
FIG. 7 illustrates an example of an embodiment of a device according to the invention.

FIG. 7 illustrates an embodiment of a device 100 (for a transmitter or receiver) configured to implement an embodiment of a method according to the invention. The device 100 comprises a random access memory 130 (e.g. RAM), a processing unit 110 equipped with e.g. a processor, and driven by a computer program stored in a read-only memory 120 (e.g. ROM or hard disk). On initialisation, code instructions of the computer program are for example loaded into the RAM 130 before being executed by the processor of the processing unit 110.

This device 100 may be integrated into an augmented reality system (not shown) which may further comprise:

a camera capable of acquiring an image of a three-dimensional scene, the pose parameters of which are estimated by the device 100, a module capable of delivering an output image from an input image acquired by said camera, representing said scene in three dimensions and at least one real or virtual object, from a 3D representation representing said at least one object in the scene and from pose parameters of the camera, and a display module capable of displaying the output image.

FIG. 7 illustrates a particular way, among several possible ways, to realize the device 100 able to implement at least some steps of the method according to the invention. Indeed, these steps can be carried out either on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the processing means is realised with a reprogrammable computing machine, the corresponding program (i.e. the sequence of instructions) may be stored in a removable or non-removable storage medium, this storage medium being partially or totally readable by a computer or processor.

It goes without saying that the examples of implementation and execution described above are purely indicative and by no means limiting, and that numerous modifications can easily be made by a person having skills in the art without going beyond the scope of the invention.

The invention claimed is:

1. A method comprising:
   predicting, by a device, a three-dimensional (3D) representation in a 3D scene, using one or more two-dimensional (2D) representations obtained from at least one camera-generated image, wherein the predicting comprises the device obtaining a regression tree forest, and for said at least one image:
   extracting a 2D representation associated with one or more positions within the image;
   predicting a 3D representation, corresponding to the extracted 2D representation, using the regression tree forest which comprises a set of possible associations between at least one 2D representation and a 3D representation, each possible association resulting from a predictive model;
   evaluating one or more of the set of possible associations of the regression tree forest, according to a predetermined confidence criterion, comprising evaluating the prediction for at least one possible association as being correct or incorrect according to the predetermined confidence criterion, and wherein the predictive model of a possible association is defined by a distribution characterising the at least one 2D representation associated with the 3D representation for said possible association, and by the following parameters:
      a first parameter representative of a status of the predictive model of the possible association;
      a second parameter representative of a number of consecutive predictions evaluated as incorrect for the possible association; and
      a third parameter representative of the extracted 2D representations associated with the 3D representation by said possible association; and
   updating the regression tree forest comprising a deactivation of one or more possible associations, depending on the evaluation of said possible associations.

2. The method according to claim 1, wherein the status of the predictive model of a possible association is 'active' when said association is enabled or 'passive' when said association is disabled.

3. The method according to claim 2, wherein said updating of the regression tree forest comprises for at least one predictive model of a possible association whose status is 'active':
   updating a value of the second parameter for said possible association, based on the result of the evaluation, and
   if the value of said second parameter is above a predetermined threshold, deactivating said possible association, otherwise maintaining the 'active' status of the predictive model of said possible association.

4. The method according to claim 1, wherein updating the regression tree forest comprises for at least one predictive model of a possible association, updating a value of the third parameter according to the extracted 2D representation, and for at least one predictive model of a possible association having the status 'passive':
   if said third updated parameter meets a predetermined condition, a new determination of the distribution characterizing the 3D representation related to said possible association and a new determination of the 3D representation of said possible association, and
   if the covariance of the newly determined distribution is below a predetermined threshold, a validation of said update of the value of the third parameter, the newly determined distribution and said newly determined 3D representation, and an activation of the predictive model of said possible association,
   otherwise a reset of the value of the third parameter and a maintenance of the 'passive' status of the predictive model of said possible association.

5. The method according to claim 1, further comprising an update of pose parameters of said camera, according to the possible associations assessed as correct or incorrect.

6. The method according to claim 1, wherein the device that implements the method comprises a computer.

7. A device for predicting a three-dimensional (3D) representation in a three-dimensional scene, using one or more two-dimensional (2D) representations, obtained from at least one image generated by a camera, said device comprising:
   a computing machine dedicated to or configured to:
   obtain a regression tree forest, and
   for said at least one image:
      extract a 2D representation associated with one or more positions within the image;
      predict a 3D representation, corresponding to the extracted 2D representation, using the regression tree forest which comprises a set of possible associations between at least one 2D representation and a 3D representation, each possible association resulting from a predictive model;
      evaluate one or more of the set of possible associations defined by the forest of regression trees, according to a predetermined confidence criterion, comprising evaluating the prediction for at least one possible association as being correct or incorrect according to the predetermined confidence criterion, and wherein the predictive model of a possible association is defined by a distribution characterising the at least one 2D representation associated with the 3D representation for said possible association, and by the following parameters:
         a first parameter representative of a status of the predictive model of the possible association;
         a second parameter representative of a number of consecutive predictions evaluated as incorrect for the possible association; and
         a third parameter representative of the extracted 2D representations associated with the 3D representation by said possible association; and
      update the regression tree forest including a deactivation of one or more possible associations, depending on the evaluation of said possible associations.

8. The device according to claim 7, the computing machine is further dedicated to or configured to update pose parameters related to said camera, according to the possible associations assessed as correct or incorrect.

9. An augmented reality system comprising:
a camera capable of acquiring an image of a three-dimensional scene,
a module capable of delivering an output image from an input image acquired by said camera, representing said scene in three dimensions and at least one real or virtual object, from:
a 3D representation of the at least one object in the scene, and
camera pose parameters,
the module comprising a device for updating installation parameters of said camera, the device comprising a computing machine dedicated to or configured to:
obtain a regression tree forest, and
for said input image acquired by the camera:
extract a 2D representation associated with one or more positions within the image;
predict the 3D representation, corresponding to the extracted 2D representation, using the regression tree forest which comprises a set of possible associations between at least one 2D representation and a 3D representation, each possible association resulting from a predictive model;
evaluate one or more of the set of possible associations defined by the forest of regression trees, according to a predetermined confidence criterion, comprising evaluating the prediction for at least one possible association as being correct or incorrect according to the predetermined confidence criterion, and wherein the predictive model of a possible association is defined by a distribution characterising the at least one 2D representation associated with the 3D representation for said possible association, and by the following parameters:
a first parameter representative of a status of the predictive model of the possible association;
a second parameter representative of a number of consecutive predictions evaluated as incorrect for the possible association; and
a third parameter representative of the extracted 2D representations associated with the 3D representation by said possible association; and
update the regression tree forest including a deactivation of one or more possible associations, depending on the evaluation of said possible associations, and
update the pose parameters related to said camera, according to the possible associations assessed as correct or incorrect,
a display module capable of displaying the output image.

10. A non-transitory computer-readable storage medium having recorded thereon a computer program comprising program code instructions for predicting a three-dimensional (3D) representation in a 3D scene, when the instructions are executed by a processor, wherein the instructions configure the processor to predict the 3D representation using one or more two-dimensional (2D) representations obtained from at least one camera-generated image, wherein the predicting comprises:
obtaining a regression tree forest, and
for said at least one image:
extracting a 2D representation associated with one or more positions within the image;
predicting a 3D representation, corresponding to the extracted 2D representation, using the regression tree forest which comprises a set of possible associations between at least one 2D representation and a 3D representation, each possible association resulting from a predictive model;
evaluating one or more of the set of possible associations of the regression tree forest, according to a predetermined confidence criterion, comprising evaluating the prediction for at least one possible association as being correct or incorrect according to the predetermined confidence criterion, and wherein the predictive model of a possible association is defined by a distribution characterising the at least one 2D representation associated with the 3D representation for said possible association, and by the following parameters:
a first parameter representative of a status of the predictive model of the possible association;
a second parameter representative of a number of consecutive predictions evaluated as incorrect for the possible association; and
a third parameter representative of the extracted 2D representations associated with the 3D representation by said possible association; and
updating the regression tree forest comprising a deactivation of one or more possible associations, depending on the evaluation of said possible associations.

* * * * *